United States Patent [19]
Bridge et al.

[11] Patent Number: 5,601,700
[45] Date of Patent: Feb. 11, 1997

[54] SCAVENGING OF HYDROGEN SULPHIDE

[75] Inventors: Norman Bridge, Lancashire; Robert McGowan, Aberdeenshire, both of United Kingdom

[73] Assignees: William Blythe Limited, England; Blacksmith Chemical Services, Scotland

[21] Appl. No.: 362,979

[22] Filed: Dec. 23, 1994

Related U.S. Application Data

[63] Continuation of PCT/GB93/01339, Jun. 25, 1993.

[30] Foreign Application Priority Data

Jun. 26, 1992 [GB]   United Kingdom ................... 9213628

[51] Int. Cl.[6] .................................................. C10G 19/00
[52] U.S. Cl. .................... 208/208 R; 208/226; 208/230; 210/749; 210/758
[58] Field of Search ...................... 208/226, 230, 208/208 R; 210/749, 758; 423/222, 574.2, 575

[56] References Cited

U.S. PATENT DOCUMENTS

| | | | |
|---|---|---|---|
| 2,110,403 | 3/1938 | Rosenstein | 208/230 |
| 4,076,621 | 2/1978 | Hardison | 210/60 |
| 4,171,349 | 10/1979 | Cucuiat et al. | 423/574 L |
| 4,477,337 | 10/1984 | Ronden et al. | 208/188 |
| 5,346,614 | 9/1994 | Culver et al. | 208/242 |

FOREIGN PATENT DOCUMENTS

| | | | |
|---|---|---|---|
| 0097303 | 1/1984 | European Pat. Off. | |
| 50-71567 | 6/1975 | Japan | |
| 53-48101 | 5/1978 | Japan | 423/222 |
| 54-6858 | 1/1979 | Japan | 423/222 |

*Primary Examiner*—Gary P. Straub
*Assistant Examiner*—Timothy C. Vanoy
*Attorney, Agent, or Firm*—Bernard L. Kleinke; Peter P. Scott

[57] ABSTRACT

A method for the removal of hydrogen sulphide from a hydrocarbon-water mixture. The method utilizes a sulphite or a bisulphite, preferably ammonium bisulphite. It may be added as a salt or in solution. It is used in amounts by weight of from 2:1 salt: hydrogen sulphide.

11 Claims, 1 Drawing Sheet

SCAVENGING OF HYDROGEN SULPHIDE

This application is a continuation of international application PCT/GB93/01339, filed 25 June 1993 which designated the U.S. and is now abandoned.

The present invention relates to the scavenging or removal of hydrogen sulphide. More particularly it relates to the removal of hydrogen sulphide from a gaseous medium, a liquid medium or the like.

The present invention is of general applicability to hydrogen sulphide removal from situations in which it is an undesired contaminant. Such situations include contamination of hydrocarbon deposits in the oil industry. It is, however, of particular applicability to the removal of hydrogen sulphide which occurs in the extraction of hydrocarbons and associated water from subterranean deposits, for example, those deposits which are beneath the sea-bed, for example in the North Sea. It may also be used, for example, for the removal of hydrogen sulphide occurring in liquid or gas media after extraction, i.e. during production.

The presence of hydrogen sulphide associated with many hydrocarbons and possibly associated water deposits may arise from the action of microorganisms on organic sulphur compounds occurring therein. In extracting as hydrocarbons from subterranean deposits, water, for example sea water, is introduced into the hydrocarbon bearing formation, to maintain the pressure. The hydrocarbons (liquid and/or gas) removed from subterranean deposits can thus be associated with water, and can also thus have present therein hydrogen sulphide as an undesired contaminant. Unless the hydrogen sulphide can be satisfactorily removed, it constitutes a hazard even at low concentrations and as the level increases it can lead to premature closure of the well which extracts the hydrocarbons and associated water from a particular hydrocarbon bearing formation.

Since removal of as much of the hydrocarbons as possible is desired from any particular hydrocarbon bearing formation, any means of removing the hydrogen sulphide from the hydrocarbons and associated water represents the solution of a problem in the industry. The concentration of hydrogen sulphide in such hydrocarbons and associated water mixture (usually an emulsion) may be, for example, of the order of 5–1000 ppm. If it is not removed, it may find its way into the sea, or be flashed off into the atmosphere, particularly in the atmosphere associated with an extraction process for separating the liquid and/or gaseous hydrocarbon from its associated water. Such extraction is conventionally conducted on a platform which may be adjacent to or several kilometres from one or more well-heads at which the hydrocarbons are extracted from a subterranean formation.

It is well known that hydrogen sulphide is both toxic and explosive, so constituting a health and safety hazard as well as being environmentally undesirable. Even if the hydrogen sulphide does not find its way into the sea or is flashed off, there remains the problem that it may still be associated with the hydrocarbons which are separated from the hydrocarbons-water mixture. The presence of hydrogen sulphide in hydrocarbons may also have detrimental effects on refining catalysts in downstream processing operations.

Also in moist conditions, hydrogen sulphide gas will attack steel to form ferrous sulphide and free hydrogen. The free hydrogen may penetrate the metal causing hydrogen embrittlement. Corrosive surface attack may cause pitting which may augment stress corrosion and/or hydrogen stress cracking. Brittle fractures have occurred with very little hydrogen sulphide present in the system.

Many substances have been proposed as hydrogen sulphide scavengers in the oil industry, both inorganic and organic. It is desirable that a scavenger for removal of hydrogen sulphide from a liquid or gaseous medium, such as, for example, a hydrocarbon-water mixture (usually an emulsion) or dry hydrocarbons, satisfies as many as possible of a list of criteria which comprises:

(a) removes or substantially reduces hydrogen sulphide from the hydrocarbon-water mixture or the dry hydrocarbons, (b) converts the hydrogen sulphide into innocuous sulphur species which partition preferentially in the water phase;

(c) is low or non-corrosive to mild and stainless steels (being the usual materials used in the pipe-work and associated apparatus);

(d) can be effective in a relative low ratio (say 20 parts per part of hydrogen sulphide);

(e) contains no heavy metals, not classified as harmful to humans or the marine environment, and is not classified as hazardous for transport purposes;

(f) has a low pour point and is thermally stable across a range of field operating conditions including "downhole" applications; and (g) has a reaction time such that as much hydrogen sulphide as possible is scavenged from treated liquids and/or gas prior to the next process step.

The treatment of produced fluids, or those stored either onshore or offshore, by scavenger should be capable of reducing hydrogen sulphide to acceptable levels in the time constraints prevailing in the process operation. For produced fluids it would be highly desirable to control the hydrogen sulphide removal on the extraction rig or platform referred to above where the separation of the hydro-carbons from associated water is performed. In such circumstances a further important criterion for a suitable scavenger arises, namely that it be fast in action. More particularly, the removal of hydrogen sulphide in such an operation should be capable of being effected during a short contact time, which can be as little as for example, a minute.

As one or more of these criteria are met, so the disadvantages associated with the scavenger of the prior art are alleviated.

Prior art scavengers in the oil industry include both inorganic and organic materials.

Inorganic materials which have been considered or even tried include copper compounds, sodium nitrite, hydrogen peroxide, sodium chlorite and chlorine dioxide. All have at least one of the disadvantages considered above. Some compounds are harmful, corrosive or have corrosive by-products, may be unstable or potentially explosive and may require special handling technique.

Organic scavengers which have been tried include formaldehyde, glutaraldehyde and particularly glyoxal as well as glyoxal/surfactant mixtures. None of these materials is particularly satisfactory. They are slow in reaction with hydrogen sulphide are unstable at high temperature and pressure and solidify at low temperatures and on long term storage. Some are also expensive, bearing in mind the large volume of hydrocarbon-water mixture to be treated. If a slow reacting hydrogen sulphide scavenger is used, for example glyoxal, it may be necessary either to introduce it at a point which would allow the maximum reaction time or to substantially increase the dosage.

In DD93734 alkaline liquid waste from the leather industry was treated with sodium hydrogen sulphite. The sodium hydrogen sulphite was thoroughly mixed in a stirring apparatus, the neutral point was precisely determined with the aid of a redox measuring chain and the reaction waste liquid was aerated and allowed to settle.

In JP 50008327A waste gas was treated with sodium hydrogen sulphite solution.

In JP 50071567 sodium hydrogen sulphite was used in the treatment of alkaline wastes.

It has now been found that a particular class of inorganic substances can be used to rapidly and effectively remove hydrogen sulphide contaminant from a liquid and/or gas hydrocarbon, particularly a dry crude or a hydrocarbon-water mixture, for example an emulsion.

According to the present invention there is provided a composition or solution thereof for the removal of hydrogen sulphide contaminant from a liquid and/or gas hydrocarbon which comprises a sulphite, and/or a bisulphite and one or more additives selected from the group comprising a metal sequesterizing agent, a pH modifier, a corrosion inhibitor, and a scale inhibitor.

Thus, where soluable iron species may be present, it is desirable to include an effective amount of a metal sequestering agent, such as, for example EDTA. The metal sequestering agent should be present in an amount sufficient to sequester the metal ions present. Thus, for EDTA it is recommended that an amount of 10 times more than the suspected iron level is used. Thus where the iron level is calculated at 50 ppm the sequestering agent should be used in an amount of 500 ppm.

The pH modifier used is alkaline and is used to bring the pH of the solution used to between pH 4–7. A typical pH modifier would be sodium or ammonium hydroxide.

The corrosion inhibitor is used in amounts typically used in the oil industry. Thus, for example, BLACKSMITH CP1260 (imadazoliane type) could be used and if used would be used in an amount of, for example 10 ppm.

The scale inhibitor is used in amounts typically used in the oil industry. Thus for example, BLACKSMITH SA443W (polyacrylate type) could be used and if used would be used in an amount of, for example, 20 ppm. Alternatively BLACKSMITH SA450, an equivalent of Bellasol S40 (polyphosphene carboxylic acid type) could be used in an amount of, for example 29 ppm. Joint corrosion inhibitors/scale inhibitors such as, for example, BLACKSMITH CP1210 (phosphonate/imadazoliane type) could also be used. A typical amount would be, for example, 25 ppm.

According to another aspect of the present invention there is provided a product which comprises a sulphite and or a bisulphite and one or more additives selected from this group comprising a metal sequestering agent, a pH modifier; a corrosion inhibitor and a scale inhibitor for simultaneous, separate or sequential use in the treatment of hydrogen sulphide contaminant from a liquid and/or gas hydrocarbon.

According to the present invention there is also provided a method of removing hydrogen sulphide from hydrocarbons or hydrocarbons and their associated water deposits which method comprises treating the hydrocarbon or a hydrocarbon-water mixture with a sulphite or bisulphite.

BRIEF DESCRIPTION OF DRAWING

The above mentioned objects and features of this invention and the manner of attaining them will become apparent, and the invention itself will best be understood by reference to the following description of the embodiment of the invention in conjunction with the accompanying drawing, wherein the drawing is a graph illustrating the species detected by ion chromatography relative to peak height versus time.

Preferably, the liquid and/or gas medium is a hydrocarbon-water mixture.

Figure 1:
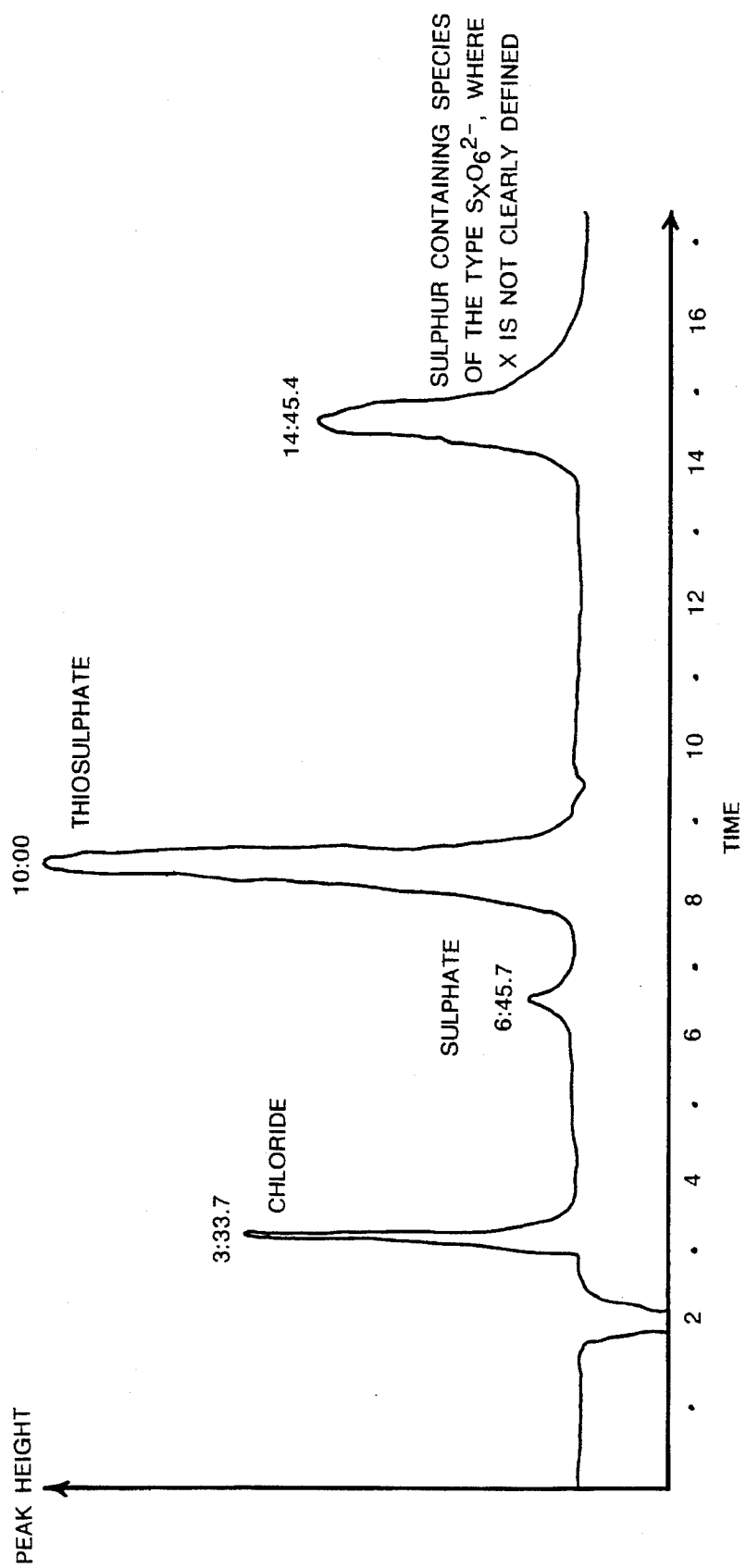

Among the sulphites and bisulphites which may be used are those of alkali metals, alkaline earth metals and particularly ammonium and solutions thereof.

Bisulphite, particularly ammonium bisulphite is preferred to the corresponding sulphite. Use of the bisulphite, because of its higher solubility in water, leads to a lower reagent/hydrogen sulphite weight ratio as specified in the criteria hereinabove. Under certain conditions, the reaction of hydrogen sulphide with the bisulphite leads not only to the production of water soluble thio compounds but also precipitation of sulphur. Without wishing to be bound by theory it is believed that the hydrogen sulphide is converted into innocuous sulphur species—e.g. thiosulphate—see drawing—which shows the species detected when a sample contaminated with hydrogen sulphide and treated with ammonium bisulphite was tested by ion chromatography. The peaks were identified by reference to standards. Adjustment of the pH by addition of an alkali, for example sodium hydroxide, whilst not improving the performance of the scavenger, can prevent sulphur precipitation.

The weight ratio of scavenger to hydrogen sulphide can be as low as 2:1 when long reaction times (e.g. 20 hours) are used, but for shorter time (e.g. minutes) a weight ratio of 7.4:1 or greater is required depending on the reagent employed. When using ammonium bisulphite solution, weight ratios of 20:1 or less have been found to achieve satisfactory elimination of hydrogen sulphide. The more concentrated the ammonium bisulphite solution, the lower the weight ratio.

The method of the present invention has been found applicable even at elevated temperatures and pressures. Typical temperatures and pressures of the hydrocarbon-water mixture, as removed from the subterranean hydrocarbon bearing formation at a depth of 8000 feet, are 5200 Psi and 54°–76° C.

The present invention will now be further described with reference to, but in no manner limited to, the following examples. In these examples, the following apparatus, reagents and tests were employed. The reagent: $H_2S$ ratios quoted are on a weight basis.

APPARATUS

Examples 1 to 5 and 13 to 20 used a 250 ml round bottomed flask with stopper, magnetic stirrer and follower. Examples 6 to 8 used a 2-litre beaker, stirrer, hotplate and separating funnel.

Reagents

Sodium Sulphide Analar (BDH)
Synthetic sea water (BDH)
Alkaline lead acetate solution
North Sea crude oil
Dilute Hydrochloric Acid
32% w/w Sodium Bisulphite solution
Sodium Sulphite
65% w/w Ammonium Bisulphite solution
48% w/w Sodium Hydroxide solution
Corrosion Inhibitor, CP1260
Corrosion/Scale Inhibitor, CP1210
Scale Inhibitor Bellasol S40

Scale Inhibitor, SA443W
Iron(II) Chloride Tetrahydrate, BHD
EDTA Disodium Salt, BDH (Hydrogen Sulphide was generated in situ by adding the required quantity of sodium sulphide and lowering the pH to around 5 with dilute hydrochloric acid. A small amount of sulphur was precipitated during this operation).

Test for Sulphide 1 ml of test solution diluted to 50 ml with deionised water in a Nestler Tube and 1 ml of alkaline lead acetate added and mixed. This is compared with a blank consisting of 50 ml of deionised water in a Nestler to which 1 ml of alkaline lead acetate is added and mixed. A brown/black turbidity is produced if sulphide is present. The sensitivity of the test has been determined to be <1 ppm $H_2S$ in the laboratory.

EXAMPLE 1

250 ml water containing Sodium Sulphide (equivalent to 500 ppm Hydrogen Sulphide) was treated with 3.82 g 32% Sodium Bisulphite solution. After stirring for three minutes no sulphide could be detected. (Reagent: $H_2S$—30.6:1).

EXAMPLE 2

250 ml synthetic seawater containing Sodium Sulphide (equivalent to 500 ppm Hydrogen Sulphide) was treated with 3.82 g 32% Sodium Bisulphite. The solution developed a slight colour which disappeared after three minutes stirring. At this time no sulphide could be detected.

EXPERIMENT 3

250 ml synthetic seawater containing 500 ppm Hydrogen Sulphide was treated with 3.82 g 32% Sodium Bisulphite solution. Sulphur was precipitated, giving the solution a milky appearance. After three minutes, no sulphide could be detected, and the sulphur was still present.

EXAMPLE 4

250 ml synthetic seawater containing 500 ppm Hydrogen Sulphide was treated with 0.92 g Sodium Sulphite (solid). After three minutes stirring no sulphide could be detected. ($Na_2SO_3$:$H_2S$—7.4:1).

EXAMPLE 5

250 ml synthetic seawater containing 500 ppm Hydrogen Sulphide was treated with 13.4 g of an Ammonium Bisulphite/Sodium Hydroxide solution (11.8% $SO_2$ pH 6.6). No sulphide could be detected after three minutes stirring. (Reagent: $H_2S$—107.2:1)

EXAMPLE 6

One litre of synthetic seawater containing 500 ppM Hydrogen Sulphide was dosed with 1.2 g of 48% Sodium Hydroxide then 6.8 g 65% Ammonium Bisulphite were added. After three minutes stirring sulphide could only very faintly be detected. (Reagents: $H_2S$—16:1)

EXAMPLE 7

Example 6 was repeated at 60° C., with the same result.

EXAMPLE 8

500 mls of synthetic seawater containing 500 ppm Hydrogen Sulphide was stirred vigorously with 200 ml of crude North Sea oil at 60° C. 26.8 g Ammonium Bisulphite/Sodium Hydroxide solution was added (as Example 5) and after three minutes the two layers were separated. No sulphide could be detected in the aqueous layer.

EXAMPLE 9

Example 6 was repeated in the present of 400 ml of crude North Sea oil at 60° C. After three minutes the two layers were separated and no sulphide was detected in the aqueous layer.

EXAMPLE 10

The following method has been used to compare the performance of scavengers. Briefly the test involves generating hydrogen sulphide in situ in 1 litre of an oil emulsion, which is at the desired temperature for the test (usually around 60° C). The hydrogen sulphide concentration is determined by withdrawing a sample of the emulsion, mixing this with kerosene in a Drechsel bottle fitted with a sparging head, then flushing the hydrogen sulphide out of the mixture with an inert gas, (carbon dioxide or nitrogen), the gas stream passing through a hydrogen sulphide extraction (Drager) tube. Sparging continues until no further colour change occurs in the Drager tube and this reading is translated into ppm hydrogen sulphide in the system. The scavenger is then introduced with stirring and samples withdrawn after 2, 10, 20, 30, 40 and 50 minutes. These are tested in the same manner as the untreated emulsion, adjusting the sample size for maximum accuracy.

The following results were obtained by this method, comparing 65% w/w ammonium bisulphite (ABS) with glyoxal:

| Time after addition of scavenger (mins) | Glyoxal (weight ratio 10:1) | ABS (weight ratio 10:1) | ABS (weight ratio 20:1) |
| --- | --- | --- | --- |
| 0 | 120 | 120 | 120 |
| 2 | 75 | 37 | Not detected |
| 10 | 15 | 12 | Not detected |
| 20 | 7 | 5 | Not detected |
| 30 | 5 | 1 | Not detected |
| 40 | 3 | Not detected | Not detected |
| 50 | 3 | Not detected | Not detected |

In addition to the foregoing examples the following trial was also conducted.

EXAMPLE 11

An oil-water emulsion (0.5% water) contained within a storage cell had its $H_2S$ levels monitored and was then emptied. An amount of ammonium bisulphite was added to give a dosage rate of 15:1 ammonium bisulphite to hydrogen sulphide. The ammonium bisulphite was introduced between the booster and export pumps and no agitation provided.

The hydrogen sulphide levels were measured 10 hours later when the emulsion had been conveyed to new storage cells. Upon arrival the hydrogen sulphide level was found to have been reduced from an initial level of 75–150 mg/l to 20 mg/l or less.

However, due to the nature of the trial the final measured emulsion contained untreated emulsion from other cells, the total volume having increased from 500 m³/hour (cell treated) to 1500 m³/hour on final testing.

EXAMPLE 12

In another trial the addition of ammonium bisulphite at a dosage rate of 15:1 ammonium bisulphite to hydrogen sulphite was shown to reduce hydrogen sulphide levels from 375 ppm to 20 ppm.

EXAMPLE 13

100 ml of distilled water, containing 500 ppm of $H_2S$ and 10 ppm or corrosion inhibitor CP1260, was treated with 2.2 g of 65% ammonium bisulphite solution. After 2 minutes, no sulphide could be detected.

EXAMPLE 14

100 ml of distilled water, containing 500 ppm $H_2S$ and 25 ppm of corrosion/scale inhibitor CP1210, was treated with 2.2 g of 65% ammonium bisulphite solution. After 2 minutes, no sulphide could be detected.

EXAMPLE 15

100 ml of distilled water, containing 500 ppm of $H_2S$ and 20 ppm of scale inhibitor SA443W, was treated with 2.2 g of 65% ammonium bisulphite solution. After 2 minutes, no sulphide could be detected.

EXAMPLE 16

100 ml of distilled water, containing 500 ppm $H_2S$ and 29 ppm of scale inhibitor Bellasol S40, was treated with 2.2 g of 76% ammonium bisulphite solution. After 2 minutes, no sulphide could be detected.

EXAMPLE 17

100 ml of synthetic produced water containing 500 ppm $H_2S$ and 50 ppm $Fe^{2+}$ (added as $FeCl_2 4H_2O$), was treated with 2.2 g of 65% ammonium bisulphite solution. After 2 minutes, sulphide could easily be detected i.e. well above the detection limit of test.

EXAMPLE 18

Example 17 was repeated, adding 500 ppm of EDTA disodium salt to the solution prior to the addition of 2.2 g ammonium bisulphite solution. After 2 minutes only a very slight trace of sulphide could be detected, close to the detection limit of <1 ppm.

EXAMPLE 19

Example 17 was repeated, adding 2.2 g ABS containing 500 ppm EDTA disodium salt. After 2 minutes only a very slight trace of sulphide could be detected, close to the detection limit of <1 ppm.

EXAMPLE 20

300 ml of distilled water containing 500 ppm of $H_2S$ (flask filled with solution to eliminate air), was dosed with 1.3515 g 65% ammonium bisulphite solution. the flask was stoppered and stirred for 20 hours after which time no sulphide could be detected. [Ratio of scavenger to $H_2S$, 2:1].

We claim:

1. A method of removing hydrogen sulphide from crude oil or an oil and water emulsion which method comprises treating the crude oil or an oil and water emulsion with a solution of sulphite or bisulphite selected from the group consisting of alkali metals, alkaline earth metals, ammonium sulphite and ammonium bisulphite, wherein the pH of the solution of sulphite or bisulphite is maintained between about 4 and about 7 by the addition of an alkali, so as to prevent sulphur precipitation in the crude oil or oil and water emulsion being treated.

2. A method as claimed in claim 1, wherein the crude oil or an oil and water emulsion is treated during extraction from subterranean deposits.

3. A method as claimed in claim 1, wherein the treatment is conducted at a well head.

4. A method as claimed in claim 1, wherein the process is conducted at a temperature ranging from 54°–76° C.

5. A method as claimed in claim 1, wherein the treatment is conducted on an extraction rig or platform.

6. A method as claimed in claim 1, wherein the sulphite or bisulphite is added in an amount by weight of greater than 2:1 sulphite or bisulphite to hydrogen sulphide.

7. A method as claimed in claim 6, wherein the sulphite or bisulphite is added in an amount by weight of between 7.4:1 to 100:1 sulphite or bisulphite to hydrogen sulphide.

8. A method as claimed in claim 7, wherein the sulphite or bisulphite is added in an amount by weight of from 10–20:1 sulphite or bisulphite to hydrogen sulphide.

9. A method as claimed in claim 1, in which the method further comprises adding a metal sequestering agent to the solution of sulphite or bisulphite.

10. A method as claimed in claim 1, in which the method further comprises adding a corrosion inhibitor to the solution of sulphite or bisulphite.

11. A method as claimed in claim 1, in which the method further comprises adding a scale inhibitor to the solution of sulphite or bisulphite.

\* \* \* \* \*

UNITED STATES PATENT AND TRADEMARK OFFICE
CERTIFICATE OF CORRECTION

PATENT NO : 5,601,700
DATED : February 11, 1997
INVENTOR(S): Norman Bridge and Robert McGowan It is certified that error appears in the above-identified patent and that said Letters Patent is hereby corrected as shown below:

On the face page, item 73, after "Blacksmith Chemical Services", please insert --Limited--.

Signed and Sealed this

Thirtieth Day of September, 1997

Attest:

BRUCE LEHMAN

Attesting Officer

Commissioner of Patents and Trademarks